United States Patent
Weber

(10) Patent No.: US 7,155,493 B1
(45) Date of Patent: Dec. 26, 2006

(54) METHOD AND APPARATUS FOR IMPROVED INTERNET NAVIGATION

(75) Inventor: Owen Wayne Weber, Coppell, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/182,303

(22) Filed: Oct. 29, 1998

(51) Int. Cl.
*G06F 13/00* (2006.01)

(52) U.S. Cl. .......................... 709/218; 707/10; 709/202
(58) Field of Classification Search ................. 709/202, 709/219, 224, 245, 218; 707/10, 517; 345/437
See application file for complete search history.

(56) References Cited

U.S. PATENT DOCUMENTS

| | | | | |
|---|---|---|---|---|
| 6,006,260 A | * | 12/1999 | Barrick, Jr. et al. | 709/224 |
| 6,026,437 A | * | 2/2000 | Muschett et al. | 709/219 |
| 6,035,330 A | * | 3/2000 | Astiz et al. | 709/218 |
| 6,049,342 A | * | 4/2000 | Nielsen et al. | 345/473 |
| 6,061,686 A | * | 5/2000 | Gauvin et al. | 707/10 |
| 6,061,700 A | * | 5/2000 | Brobst et al. | 707/517 |
| 6,061,738 A | * | 5/2000 | Osaku et al. | 709/245 |
| 6,144,962 A | * | 11/2000 | Weinberg et al. | 707/10 |

* cited by examiner

*Primary Examiner*—David Wiley
(74) *Attorney, Agent, or Firm*—Robert M. Carwell

(57) ABSTRACT

A monitor analyzes and generates a profile of an Internet website data transmission. The profile indicates the relative load and/or execution times of different components of the data, including text, images, and Java code. The profile is displayed and an end-user deselects one or more of the data components which are of marginal interest but contributing to the webpage load or execution times, whereupon the altered profile is stored. During a next access of the website, the altered profile is retrieved and utilized to selectively control a more limited load and/or execution of subsequently transmitted website data by eliminating the previously de-selected data types. The load or execution times associated with pages of the website are thereby reduced. In one embodiment, the profile is pre-generated and stored with the website data and transmitted in the website data transmission for display and alteration.

27 Claims, 3 Drawing Sheets

METHOD AND APPARATUS FOR IMPROVED INTERNET NAVIGATION

BACKGROUND OF THE INVENTION

1. Field of the Invention

This invention relates to Internet end-user systems and, more particularly, relates to technology for improving the efficiency with which such end-users are able to navigate the Internet.

2. Background and Related Art

The recent evolution and promulgation of the Internet has been compared in its significance to human development to the invention of the printing press. However, anyone who has spent even a small amount of time navigating the worldwide web very quickly becomes aware of one of the serious impediments to its use, namely the long delays which may be experienced while waiting for web pages to be downloaded and displayed. These delays may be attributable to a number of factors, including the sheer numbers of new users coming on line, limited bandwidth of Internet servers, and the demands on such bandwidth resulting from the increasingly rich and complex data which is becoming available through the Internet. This data may include text, multimedia including streaming video and audio data, full motion video images, Javascript programs and Java Aplets, all of which exact increasingly greater demands on the already limited bandwidth of the Internet.

One factor which unnecessarily contributes to the performance problem is that the end-user navigating the Internet and the worldwide web in particular frequently does not know what type of data he or she is waiting on, e.g., text, images, Java programs, or the like. For the end-user to ensure that all data is displayed and therefore none is missed, the user typically does not even turn image display features off of a web browser such as the Internet Explorer or Netscape Navigator popularized by the Microsoft and Netscape Corporations, respectively. The result of this is that the user frequently and unnecessarily waits on all of the data, much of which may be irrelevant to the particular user's needs at the time.

One approach to addressing this problem, as mentioned, is to permit the end-user to at least deactivate images in the web browser which are notoriously the cause of some of this delay due to the large amount of data associated with high resolution and motion images. If the web "surfer" is only interested in the textual information of a web page, by deactivating the transmission, loading, and display of these visual images, at least the delays associated with such images are eliminated. However, several problems are associated with this approach. First, it is static in the sense that once this text only feature is activated in a browser, image data is turned off indiscriminately for the entire session and with respect to all websites and pages traversed by the user. Moreover, this deactivation of the images does not even begin to account for yet additional root causes for these delays which are becoming so serious as to effectively completely negate the utility of the Internet in many instances. These additional causes may, for example, be data types other than images such as the aforementioned Java code.

For all the foregoing reasons, technology would be highly desirable which could provide a significant performance improvement to the navigation of the Internet and websites, particularly those which are increasingly becoming enriched with associated demands on the limited Internet bandwidth.

Still further, such an improvement would be highly desired which was dynamic in nature, taking into account characteristics of different types of websites and even within a particular website, the characteristics of even individual pages or subareas of the website which may have different delay characteristics associated therewith. Still further, such a system was highly sought after which could take into account delays associated not only with visual images but other attributes of websites giving rise to undesirable delays.

SUMMARY OF THE INVENTION

A CPU monitor is provided which is capable of discriminating between different data types and web functionality or activities associated with a given website or webpage. When a website homepage is accessed by the end-user and being downloaded and displayed, the CPU monitor is activated. The monitor analyzes and profiles the data transmission from the webpage, generating a report of the characteristics of the particular download.

More particularly, the monitor determines the relative amount of time associated with a given download corresponding to each of a plurality of website data types and functions, such as the amount of load time associated with loading text, images, Javascript programs, Java Aplets and execution of Java code. Once this profile has been generated by the monitor, it is displayed to the end-user preferably in a graphical format with each type of functionality and its associated time, corresponding to CPU activity of the client machine necessary to effect the particular webpage functionality such as display of images. By inspection of the profile, the user may then determine relatively which of these webpage functions is contributing to undesirable delays, such as execution of Java Aplets and which may be dispensed with given the end-user's immediate needs. Inasmuch as the user may desire to a further navigate through the various URLs within the given profiled website, the user may make an intelligent decision to deactivate and thereby not load selected functions or features of the website. Thus, by interacting with the display, the user may deactivate Java Aplets but desire to continue displaying images. In response to this interaction, the particular web browser will dynamically be reconfigured so that upon the end-user requesting a next URL on the currently displayed page, the selected unnecessary features of the website, such as the Java Aplets, giving rise to disproportionately large shares of CPU and download time, may thereby be deactivated so as to increase performance of the associated website navigation.

In a preferred embodiment of the invention, once a given website has been visited and the profile thereby generated by the CPU monitor, such a profile associated with that particular website URL may be stored and thereafter recalled by a future access of the website, whereupon this stored profile may be utilized in subsequent more efficient navigation of the website. Alternatively, although in accordance with the invention the profiling may take place and be caused by the CPU monitor feature for conventional websites, the system contemplates the website itself being a repository of this profile data transmitted to the end-user as a data packet for use at the end-user's machine, thereby obviating the need for a real-time profiling to occur at the user's machine. Additionally, at the user's option, this profile may, as desired, be employed in navigating the entire website or, in a more granular fashion, different profiles may be generated and employed in subsections of the website or even on a per page basis as desired.

The foregoing and other objects, features and advantages of the invention will be apparent from the following more particular description of a preferred embodiment of the invention, as illustrated in the accompanying drawings wherein like reference numbers represent like parts of the invention.

DETAILED DESCRIPTION

Figure 1:
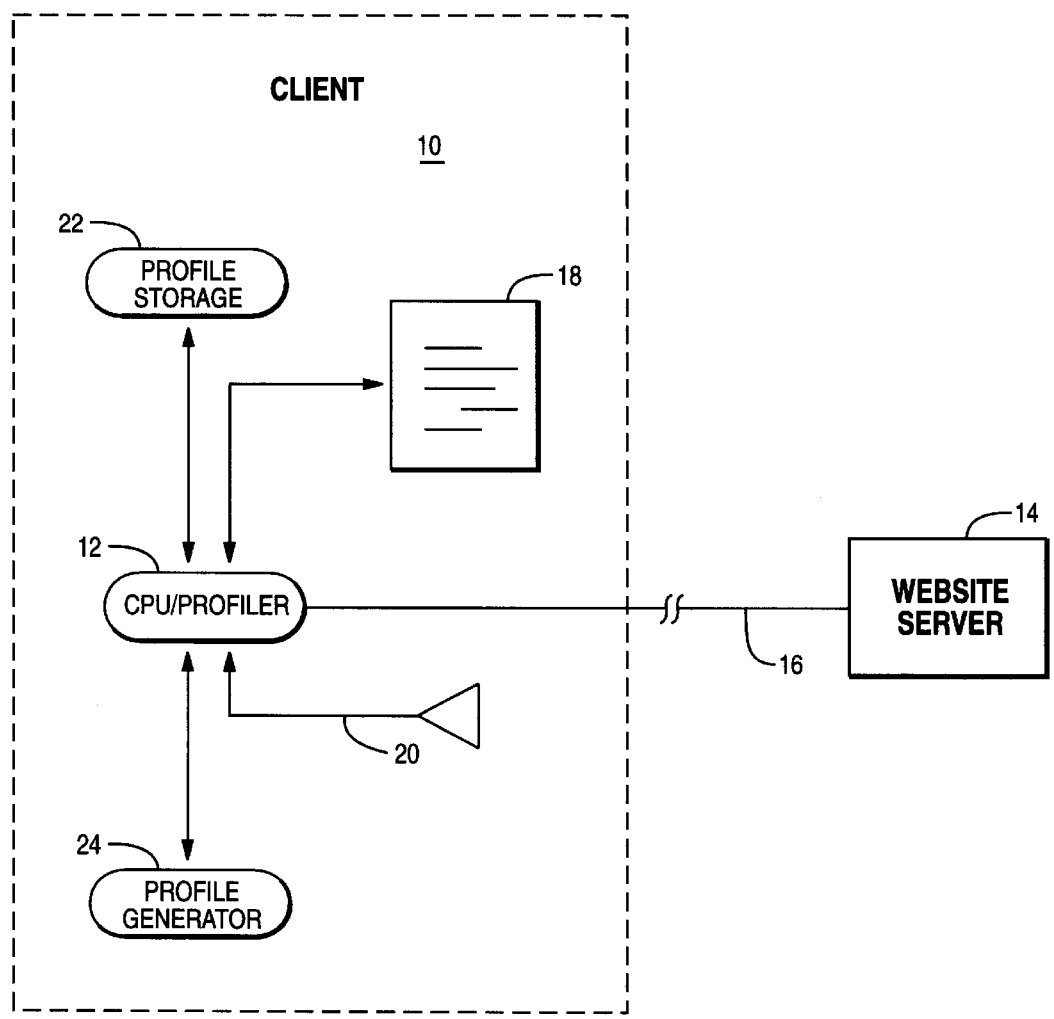
FIG. 1 is a functional block diagram illustrating a representative system of the invention in an Internet environment.

With reference to FIG. 1, depicted therein is a client machine 10 interconnected to a website server 14 by means of a conventional Internet connection 16. The end-user client machine 10 in turn may be seen to include depicted as functional block diagrams, a CPU/profiler 12, memory means for storage and retrieval of a profile 22, a dynamic profile generator 24 which is essentially comprised of program code executing in combination with the CPU/profiler 12 so as to generate profiles in the manner hereinafter described of the operation of the various pages of the website 14.

Finally, the client machine 10 will further include some form of display 18 for displaying pages of the website 14 to the end-user as well as the profiles generated by the client machine 10. Associated with the display 18 will be some conventional pointing device such as the mouse 20, enabling the end-user to select differing URL hotspots of a given displayed webpage. This pointing device 20 further enables the end-user to select desired aspects of a profile displayed on the display 18 in order to activate or deactivate them selectively so as to vary the resulting amount of CPU and display time which will be consumed by the client 10 in effecting the desired display of website data for a given website on the display 18.

As will be described in greater detail, still referring to FIG. 1, in response to the data incoming from the website 14 on the Internet connection 16, a CPU/profiler 12, responsive to the program code providing the functionality of the dynamic profile generator 24 will control the CPU/profiler 12 so as to generate the profiles to be hereinafter described which may then be stored in the profile storage memory 22 for later recall and later use in traversing the webpage and/or website associated with the initial generation of the corresponding profile. In a subsequent instruction by the end-user conveyed through the pointing device 20 on the display 18 causing the client machine 10 to re-visit a given website or webpage for which a profile is stored, this user input will cause the CPU profiler 12 to retrieve the corresponding website or webpage profile previously stored in profile storage 22. Thereafter, subsequent communication between the client 10 and website 14 will be controlled by this retrieved profile which influences operation of the CPU 12 so as to restrict in accordance with the end-user input the transmission and display of further website data on link 16 to only that which the end-user has indicated is desired. An illustration of this which follows may be helpful. Alternatively, of course, this profile may simply be used to limit and control processing and/or loading of data transmitted on link 16 by CPU 12 to thereby enhance performance.

Assuming that a given homepage URL has been downloaded from the website 14 over the Internet connection 16 and displayed or loaded on display 18. During this activity the CPU 12 activity will be monitored. When the given webpage is thereby displayed, the CPU monitor/profiler 12 will generate and display on the display 18, a report of the status of this particular download and loading or display process. As a representative example of what may be embodied in a given webpage, it may be assumed that the CPU/profiler 12 will cause on the display 18 the following result, which in a preferred embodiment would be presented to the user in a graphical format:

TABLE 1

| | |
|---|---|
| Loading Text | 0.25 seconds |
| Loading Images | 1.15 seconds |
| Loading Javascript programs | 0.35 seconds |
| Loading Java Aplets | 14.65 seconds |
| Java Execution | 0.15 seconds |
| Total CPU Time | 16.55 seconds |

The user, in seeing this profile of Table 1 displayed on the display 18 can immediately determine that of the 16.55 seconds involved in the total CPU time processing and displaying the particular webpage, that an inordinate amount of time, 14.65 seconds to be exact, is associated with loading Java Aplets imbedded in the webpage. The user may make a determination at this point that he or she really does not need any information conveyed by the Java Aplets, whereupon in response to user input on the profile through pointing device 20 on display 18, this feature of Java Aplets may be deactivated in subsequent traversals through URLs associated with this website. In this manner, nominally 89% of the total CPU time may thereby be saved which was associated with loading these unneeded Java Aplets. This new profile with deactivated Java Aplets will be stored in the profile storage 22 by the CPU 12 to control which features will be utilized in subsequent navigation of the website pages.

It will be readily appreciated that at some point if the end-user thereafter for some reason desires availability of these Java Aplets and, on the contrary, may determine that the images thereafter may not be needed, the end-user may thereafter recall the profile stored in the profile storage 22 by activating for example a right mouse click utilizing the mouse 20. Upon doing so, this profile will be retrieved from the storage 22 by the CPU 12 and again displayed on the display 18, whereupon the user may then indicate with the pointing device 20 a desire to reactivate the Java Aplets and deactivate the image loading. This newly revised profile with thereafter, in like manner to the prior profile, be stored in the profile storage 22, and this new profile employed thereafter in interfacing the website 14.

Figure 2:
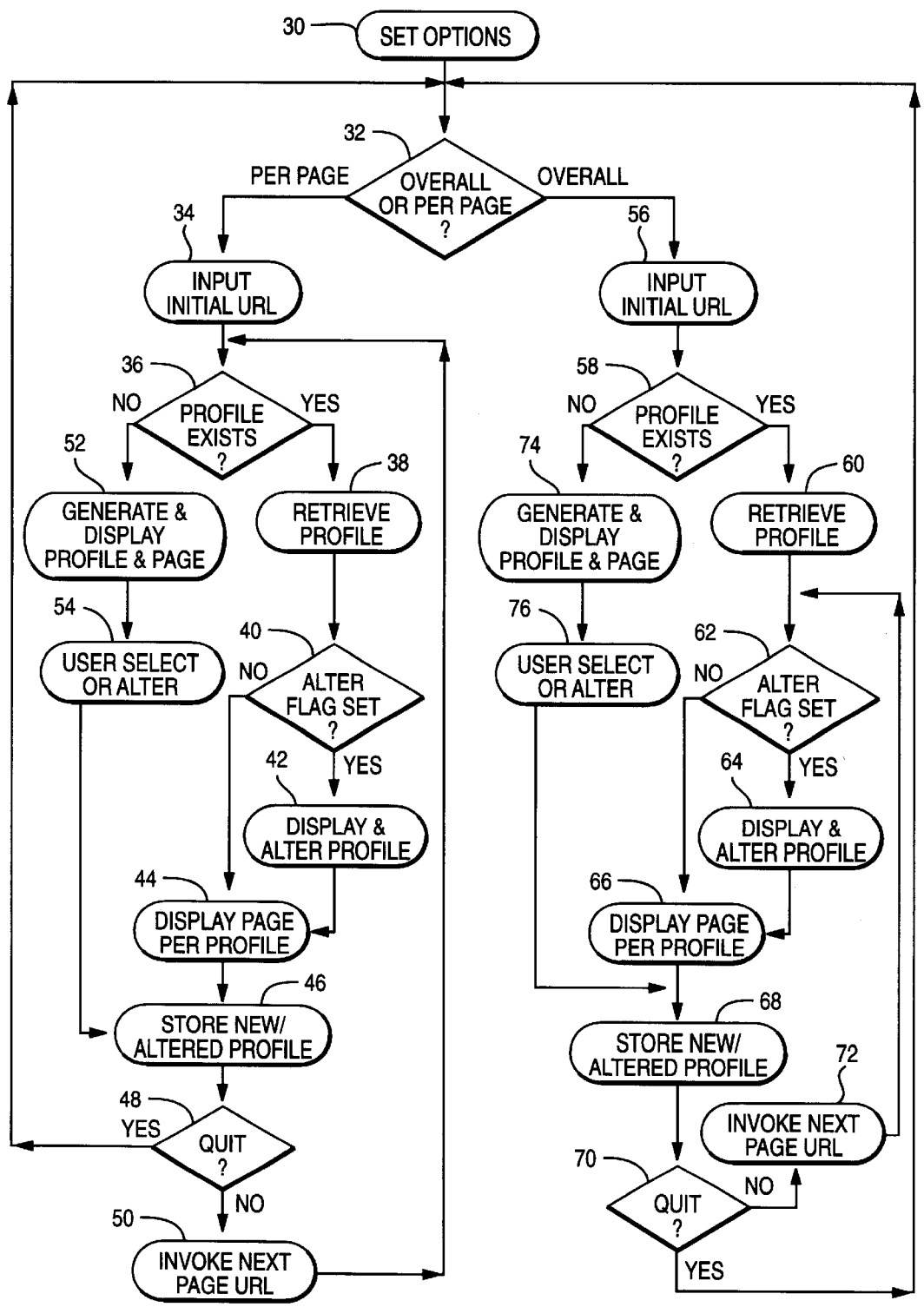
FIG. 2 is a flow diagram illustrating in accordance with the invention the system and method implementable by program code for generating and employing the CPU monitor feature of the present invention.

Turning now to FIG. 2, depicted therein is a flow diagram which may be implemented in program code for providing the profile generator function 24 of FIG. 1. First, as represented at box 30, the end-user may be queried to determine desired options. For example, the end-user may indicate whether the profiling function will be applied on a per webpage basis or on an overall basis to all of the pages on the website. Similarly, the end-user may be queried to determine whether he or she desires to alter any profiles or to simply employ those either already stored in the profile storage 22 or provided by the website 14.

The process then queries whether the profiling is to be applied on a per page or per website basis at decision block 32. If on a website basis, flow exits to the right whereupon the initial URL desired by the end-user is input, 56. The profile subsystem then queries at block 58 whether a profile exists corresponding to this URL, which may either be stored in the profile storage 22 or provided by the website 14 in a transmission over the Internet 16. If a corresponding profile to this initial web URL is found to exist by the query at block 58, the flow continues to the right whereupon this profile is retrieved, 60. Next, a query is made at decision block 62 as to whether the user had desired to alter any profiles. If so, flow exits to the right of block 62 to cause the display and permit user alteration of the profile either retrieved from the storage 22 or from the transmission from the website 14, shown at block 64.

Next, the page associated with this altered profile is displayed, 66, and this altered profile stored, 68, in the storage 22. Next, at block 70, a loop is entered waiting to determine if the end-user will continue navigating the website, 70. If the user desires to quit, the process loops to the left back to block 32 to again determine for a next upcoming website whether profile utilization is desired on a per page or overall website basis. If, on the other hand, the query at block 70 indicates the user is continuing with this particular website, a next page URL is invoked, 72, whereupon the process loops back again to block 62 to determine whether the end-user had set an option at block 30 to alter any profiles or simply to use those previously stored. The process then continues through block 62–66 for this next page URL in a manner previously described.

Returning to block 58, if program code implementing this block has determined that a profile does not exist for the URL input at block 56, the process exits to the left of block 58, whereupon a profile is generated and displayed, 74, either by monitoring and profiling the type of data incoming on link 16 (FIG. 1) or looking for a pre-existing profile header or a profile dataset stored in profile storage 22 or incoming on line 16. At block 76, the user may then select which features are desired to be activated or deactivated or altered, block 76 (such as those shown in Table 1). This new or altered profile is thereafter stored, block 68 and the process continues to block 70 as previously described.

It will be recalled that in accordance with options set at block 30, the end-user might desire more granularity to the profiling and may have set an option to employ profiling on a per page or subsection of the website basis rather than an overall website profile. In this case, the process exits to the left of block 32, whereupon an initial website homepage URL is entered by the user, 34. Hereafter, a similarity will be seen to the operation of the profiler shown in the branches on the right of FIG. 2. Thus, the profile generator 24 will first again determine if a pre-existing profile exists, 36, whether in the profile storage 22 or incoming from the website 16. If such a profile exists, flow exits to the right of block 36 whereupon this pre-existing profile is retrieved, 38. Next, a query is made as to whether the user in the option block 30 had desired to alter a profile, such query shown at block 40. If the end-user does desire to alter the profile, flow exits to the right of block 40 whereupon the profile is displayed and altered as desired, 42. The corresponding webpage is then displayed per this altered profile, block 44, and the altered profile stored, 46, in the profile storage 22.

A determination is then made at block 48 whether the end-user desires to continue navigating the website. If not, flow exits to the left of block 48 back to decision block 32. On the other hand, if the navigation of the website is continuing, flow exits to the right of block 48, a next page URL is invoked in response to user input, 50, and the process loops back to determine whether a profile exists for this next page URL, 36. After exiting block 34, if a profile did not exist for the initial URL input at block 34, flow exits to the left of block 36, whereupon a profile is generated for this initial URL page and displayed, 52. The user may then select desired functions from the profile or alter them, block 54, whereupon these altered profiles are stored at block 46. Finally, the query is once again made at block 48 of whether the user desires to continue navigating this website. If the desire is to quit, flow exits to the left of block 48 and the flow loops back to block 32.

Figure 3:
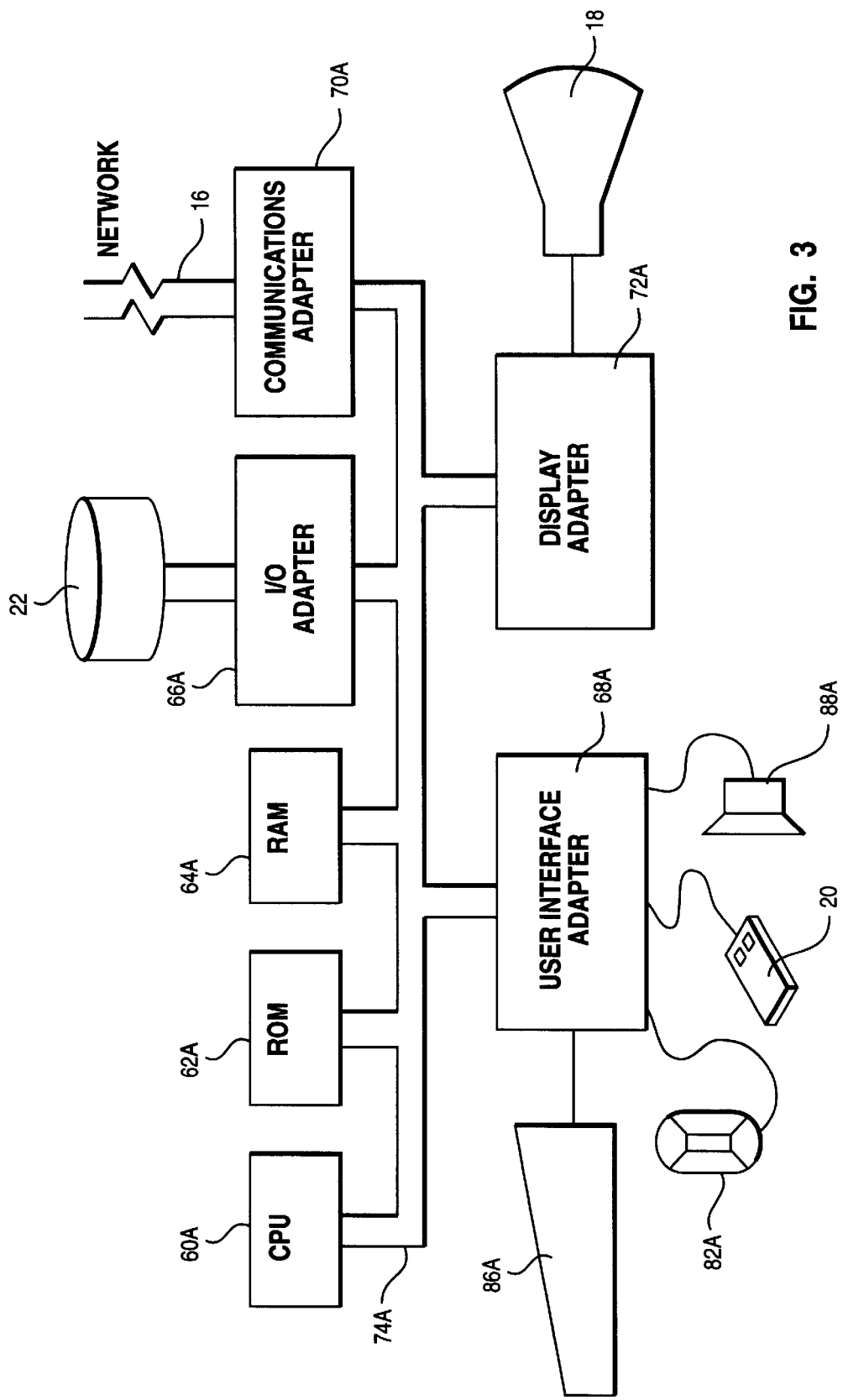
FIG. 3 is illustrates a more detailed representation of the Internet system of FIG. 1.

Turning now to FIG. 3, a representative computer system is shown in which the system and method for more efficient Internet navigation may be implemented effectively in accordance with the invention. This system may be seen as a more detailed version of the client 10 of FIG. 1. The system comprises a CPU 60A, read only memory (ROM) 62A, random access memory (RAM) 64A, I/O adapter 66A, user interface adapter 68A, communications adapter 70A, and display adapter 72A, all interconnected via a common address/data/and control path or bus 74A. Each of the above components accesses the common bus utilizing conventional techniques known to those of ordinary skill in the art, and includes such methods as dedicating particular address ranges to each component in the system, with the CPU being the busmaster. Other conventional techniques known to those of ordinary skill in the art employed in the system of FIG. 1 include direct memory access (DMA) used to transfer data at high speed from external devices such as DASD 22 to the network 16 or from the network shown to the data processing system's RAM 64A. As is further shown in FIG. 3, these external devices such as DASD 22 interface to a common bus 74A through respective adapters such as I/O adapter 66A. Other external devices, such as the display 18, similarly use their respective adapter such as display adapter 72A to provide data flow between the bus 74A and the display 18 or other device. Various user interface means are provided for interconnection and use with the user interface adapter 68A, which, in the figure has attached thereto representative user input devices such as a joy stick 82A, mouse 20, keyboard 86A, and speaker 88A. Each of these units is well known in as such and accordingly will not be described in detail herein.

The invention admits to implementation on essentially any computer system and corresponding microprocessor, such as the RS/6000™, RISC-based workstations and personal computers of the IBM Corporation executing the AIX ™ and OS/2™ operating systems, respectively, or similar machines of other vendors, which include for example in the case of an RS/6000 workstation a 604 PowerPC (TM) RISC chip. (RS/6000, IBM AIX OS/2 and PowerPC are trademarks of the IBM Corporation).

Contained with the CPU 60A of FIG. 3, typically is one or more microprocessors which performs the system address, data, and control processing functions necessary for correction operation of the of FIG. 3. Although the invention admits to application to various microprocessor designs, in the embodiment disclosed herein, the microprocessor preferably takes the form of a PowerPC 604 microprocessor manufactured by the IBM Corporation, which is a species of microprocessor known as a reduced instruction set computer (RISC) microprocessor. Further details regarding the architecture and operation of such a microprocessor may be obtained from the PowerPC 604 RISC Microprocessor Users Manual, Document #MPC604UM/AD, November, 1994, copyright IBM Corporation, which is incorporated herein by reference.

In the context of the invention, the user will view the various web pages and icons displayed on the display 18. He or she will further interact with these pages and icons by means of the various user input devices 20, 82A, 86A, 88A, as desired. This user input, in turn, may cause signals in well known signal protocol formats such as TCP/IP to be impressed upon the network 16 and generated by the system of FIG. 3 so as to cause a dialogue between the communications adapter 70A and the worldwide web connected through network 16. Information will return on the network 16 concerning the various web pages as directed by the user input. This information, including URLs such as those which may be buried in HTML source parsed through this network connection 16 will be analyzed by the system of FIG. 3 so as to generate the desired profile and display on display 18. Moreover, the system of FIG. 3 including the CPU 60A and the computer programs resident in ROM and RAM 62A–64A will effect the desired hierarchical constructs, construction and storage of user profiles, and the like as hereinbefore detailed.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for improving website navigation efficiency for an end-user comprising:
specifying a website page;
downloading data corresponding to the website page;
analyzing the data;
generating a profile comprising a plurality of parameters corresponding to loading or execution times of portions of said data in response to the analyzing of data;
displaying the profile;
altering the profile by an end-user de-selecting one or more of said portions based upon said corresponding loading or execution times;
designating a next website page; and
downloading next data from the next website page in response to the altering of the profile.

2. The method of claim 1 wherein the website page is a home page.

3. The method of claim 2 wherein the plurality of parameters include loading times for text, images, and Java programs, and Java program execution times.

4. The method of claim 3 wherein the altering comprises de-selecting one of the parameters to prevent a load or execution of a corresponding portion of said data.

5. The method of claim 4 wherein said profile is stored in said data.

6. The method of claim 5 wherein said next website page is any page hierarchically under said homepage.

7. The method of claim 6 further including storing the altered profile.

8. The method of claim 7 further including retrieving the altered profile; and wherein the downloading of next data is in response to the retrieved altered profile.

9. The method of claim 8 wherein the altered profile is stored in association with the homepage; and wherein said method further includes
specifying the website page again;
retrieving the stored altered profile;
accessing the website page again; and
downloading the next data from the website page in response to the retrieving of the stored, altered profile.

10. Apparatus for improving website navigation efficiency for an end-user comprising:
means for specifying a website page;
means for downloading data corresponding to the website page; means for analyzing the data;
means for generating a profile comprising a plurality of parameters corresponding to loading or execution times of portions of said data in response to the analyzing of data in response to the analyzing of data;
means for displaying the profile;
means for altering the profile by an end-user by de-selecting one or more of said portions based upon said corresponding loading or execution times;
means for designating a next website page; and
means for downloading next data from the next website page in response to the altering of the profile;
means for altering the profile by de-selecting one or more of said portions based upon said corresponding loading or execution times;
means for designating a next website page; and
means for downloading next data from the next website page in response to the altering of the profile.

11. The apparatus of claim 10 wherein the website page is a home page.

12. The apparatus of claim 11 wherein the plurality of parameters include means for loading times for text, images, and Java programs, and Java program execution times.

13. The apparatus of claim 12 wherein the altering comprises means for de-selecting one of the parameters to prevent a load or execution of a corresponding portion of said data.

14. The apparatus of claim 13 wherein said profile is stored in said data.

15. The apparatus of claim 14 wherein said next website page is any page hierarchically under said homepage.

16. The apparatus of claim 15 further including means for storing the altered profile.

17. The apparatus of claim 16 further including means for retrieving the altered profile; and wherein the means for downloading of data is in response to the retrieved altered profile.

18. The apparatus of claim 17 wherein the altered profile is stored in association with the homepage; and wherein said method furtherer includes
means for designating the website page again;
means for retrieving the stored altered profile;
means for accessing the website page again; and
means for downloading data from the website page in response to the retrieving of the stored, altered profile.

19. A program product for improving website navigation efficiency for an end-user comprising:
program code means for specifying a website page;
program code means for downloading data corresponding to the website page;
program code means for analyzing the data;
program code means for generating a profile comprising a plurality of parameters corresponding to loading or execution times of portions of said data in response to the analyzing of data;

program code means for displaying the profile;

program code means for altering the profile by an end-user by de-selecting one or more of said portions based upon said corresponding loading or execution times;

program code means for designating a next website page; and program code means for downloading next data from the next website page in response to the altering of the profile.

20. The program product of claim 19 wherein the website page is a home page.

21. The program product of claim 20 wherein the plurality of parameters include program code means for loading times for text, images, and Java programs, and Java program execution times.

22. The program product of claim 21 wherein the altering comprises program code means for de-selecting one of the parameters to prevent a load or execution of a corresponding portion of said data.

23. The program product of claim 22 wherein said profile is stored in said data.

24. The program product of claim 23 wherein said next website page is any page hierarchically under said homepage.

25. The program product of claim 24 further including program code means for storing the altered profile.

26. The program product of claim 25 further including program code means for retrieving the altered profile; and wherein the program code means for downloading of next data is in response to the retrieved altered profile.

27. The program product of claim 26 wherein the altered profile is stored in association with the homepage; and wherein said method farther includes program code means for specifying the website page again;

program code means for retrieving the stored altered profile;

program code means for accessing the website page again; and program code means for downloading the next data from the website page in response to the retrieving of the stored, altered profile.

* * * * *